(12) United States Patent
Gross et al.

(10) Patent No.: US 9,172,771 B1
(45) Date of Patent: Oct. 27, 2015

(54) SYSTEM AND METHODS FOR COMPRESSING DATA BASED ON DATA LINK CHARACTERISTICS

(71) Applicant: Google Inc., Mountain View, CA (US)

(72) Inventors: Dor Gross, Ganey-Tiqwa (IL); Uday Ramakrishna Naik, Fremont, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/718,908

(22) Filed: Dec. 18, 2012

Related U.S. Application Data (60) Provisional application No. 61/619,989, filed on Apr. 4, 2012, provisional application No. 61/578,661, filed on Dec. 21, 2011.

(51) Int. Cl.
| | |
|---|---|
| G06F 15/16 | (2006.01) |
| H04L 29/06 | (2006.01) |
| H04L 12/24 | (2006.01) |
| H04L 12/58 | (2006.01) |

(52) U.S. Cl.
CPC .............. *H04L 69/04* (2013.01); *H04L 41/0823* (2013.01); *H04L 51/066* (2013.01)

(58) Field of Classification Search
CPC ..... H04L 69/04; H04L 67/2828; H04L 69/22; H04L 69/329
USPC ........................................................ 709/247
See application file for complete search history.

(56) References Cited

U.S. PATENT DOCUMENTS

| | | | |
|---|---|---|---|
| 5,778,359 A | 7/1998 | Stent | |
| 6,393,435 B1 | 5/2002 | Gartner et al. | |
| 6,417,873 B1 | 7/2002 | Fletcher et al. | |
| 6,754,221 B1 * | 6/2004 | Whitcher et al. | 370/401 |
| 6,920,567 B1 | 7/2005 | Doherty et al. | |
| 6,925,646 B1 | 8/2005 | Korenshtein et al. | |
| 6,950,862 B1 * | 9/2005 | Puthiyandyil et al. | 709/220 |
| 7,372,795 B2 | 5/2008 | Yoshida et al. | |
| 7,539,698 B2 | 5/2009 | Sakaniwa et al. | |

(Continued)

FOREIGN PATENT DOCUMENTS

| | | | | |
|---|---|---|---|---|
| GB | WO0169868 | * | 9/2001 | H04L 12/56 |

OTHER PUBLICATIONS

US Office Action in U.S. Appl. No. 14/017,419 DTD Jul. 31, 2014.

(Continued)

*Primary Examiner* — Wing F Chan
*Assistant Examiner* — Padma Mundur
(74) *Attorney, Agent, or Firm* — Edward A. Gordon; Foley & Lardner LLP (57) ABSTRACT

Systems and methods for compressing data in a network system communicated across a network are discussed. The network system may determine a data link characteristic for a data link between a source and a destination. A compression algorithm may be selected from among a plurality of compression algorithms based on the data link characteristic. A chunk of data may be compressed, using the selected compression algorithm, to be communicated over the data link. A compression ratio of the compressed chunk and the chunk uncompressed may be compared to a compression threshold. The compressed chunk may be provided, using the control circuitry, if the compression ratio is greater or equal to the compression threshold. The chunk uncompressed may be provided if the first compression ratio is less than to the first compression threshold.

37 Claims, 9 Drawing Sheets

(56) References Cited

U.S. PATENT DOCUMENTS

| | | |
|---|---|---|
| 7,685,211 B2 | 3/2010 | Bergauer et al. |
| 7,689,533 B1 | 3/2010 | Bhagwat et al. |
| 7,725,437 B2 | 5/2010 | Kirshenbaum et al. |
| 7,739,240 B2 | 6/2010 | Saito et al. |
| 7,849,054 B2 | 12/2010 | Goldick |
| 7,856,437 B2 | 12/2010 | Kirshenbaum |
| 7,996,495 B2 * | 8/2011 | Dekel et al. .......... 709/219 |
| 8,060,825 B2 | 11/2011 | Chaudhri |
| 8,082,503 B2 | 12/2011 | Nam |
| 8,260,794 B2 | 9/2012 | Caceres |
| 8,560,579 B1 | 10/2013 | Gross et al. |
| 8,762,848 B2 | 6/2014 | Nam |
| 2002/0048224 A1 | 4/2002 | Dygert et al. |
| 2002/0078241 A1 * | 6/2002 | Vidal et al. .......... 709/247 |
| 2003/0177178 A1 | 9/2003 | Jones et al. |
| 2003/0182139 A1 | 9/2003 | Harris et al. |
| 2004/0009813 A1 | 1/2004 | Wind |
| 2004/0111390 A1 | 6/2004 | Saito et al. |
| 2004/0111441 A1 | 6/2004 | Saito et al. |
| 2004/0155888 A1 | 8/2004 | Padgitt et al. |
| 2004/0163123 A1 | 8/2004 | Okada et al. |
| 2005/0044158 A1 * | 2/2005 | Malik .......... 709/206 |
| 2005/0091285 A1 | 4/2005 | Krishnan et al. |
| 2005/0097135 A1 | 5/2005 | Epperson et al. |
| 2006/0047499 A1 | 3/2006 | Chen et al. |
| 2006/0236847 A1 | 10/2006 | Withop |
| 2007/0156715 A1 | 7/2007 | Mueller et al. |
| 2008/0316965 A1 * | 12/2008 | Lotter et al. .......... 370/329 |
| 2009/0037500 A1 | 2/2009 | Kirshenbaum |
| 2009/0228669 A1 | 9/2009 | Slesarev et al. |
| 2010/0185986 A1 | 7/2010 | Quintanilla et al. |
| 2011/0035376 A1 | 2/2011 | Kirshenbaum |
| 2012/0284317 A1 | 11/2012 | Dalton |
| 2013/0246352 A1 | 9/2013 | Spurlock et al. |

OTHER PUBLICATIONS

Notice of Allowance mailed Jun. 10, 2013 in U.S. Appl. No. 13/548,739.

US Office Action in U.S. Appl No. 14/017,419 DTD Nov. 13, 2014.

US Office Action in U.S. Appl. No. 14/017,419 DTD Feb. 11, 2015.

* cited by examiner

SYSTEM AND METHODS FOR COMPRESSING DATA BASED ON DATA LINK CHARACTERISTICS

CROSS-REFERENCE TO RELATED APPLICATION

This application claims the benefit under 35 U.S.C. §119 (e) of U.S. Provisional Application No. 61/619,989 filed Apr. 4, 2012, and U.S. Provisional Application No. 61/578,661 filed Dec. 21, 2011, which are hereby incorporated by reference herein in their entireties.

FIELD OF THE DISCLOSURE

This disclosure relates to a method and system for compressing data between network systems. More particularly, this disclosure relates to control circuitry configured to compress data based on data link characteristics.

BACKGROUND

As the global demand for accessing online content increases, multiple datacenters are needed to provide the content. The datacenters send and replicate data between each other in order to deliver the same data globally. The amount of data transferred between datacenters is usually large, which can take a considerable amount of time to transfer and be costly in terms of bandwidth. In many cases, the total network bandwidth of the datacenter becomes a bottleneck limiting the amount of data which can be sent at a time and affecting other services running in the datacenter. Other resources in the datacenters, such as processor, memory, and storage utilization, may be underutilized since the network bandwidth is being saturated and which other services also require to progress.

Network bandwidth is an important commodity that needs to be optimized. With the amount of data sent over networks increasing, techniques described herein may be used to reduce the amount of network bandwidth used while taking into consideration other services in the datacenter.

SUMMARY

Accordingly, systems and methods disclosed herein provide techniques for compressing data that is sent between network systems over a network. Certain implementations relate to methods for compressing data in a network system communicated across a network are discussed. Each network system may include control circuitry configured to control the operation of the network system. Processes and operations performed by the network system may be implemented using the control circuitry. The network system may determine a data link characteristic between a source and a destination. A compression algorithm may be selected among a plurality of compression algorithms based on the data link characteristic. A chunk of data may be compressed, using the selected compression algorithm, to be communicated over the data link. A compression ratio of the compressed chunk and the chunk uncompressed may be compared to a compression threshold. The compressed chunk may be provided if the compression ratio is greater or equal to the compression threshold. The chunk uncompressed may be provided if the first compression ratio is less than to the first compression threshold.

Certain implementations relate to methods for compressing data in a network system communicated across a data link. Each network system may include control circuitry configured to control the operation of the network system. Processes and operations performed by the network system may be implemented using the control circuitry. The network system may compress using a plurality of compression algorithms a chunk of data to be communicated over a data link. A compression ratio of the compressed chunk and the chunk uncompressed may be determined for each of the plurality of compression algorithms. A data link characteristic may be determined. A compression algorithm may be selected based on its respective compression ratio and the data link characteristic. The compressed chunk, compressed using the selected first compression algorithm, may be provided.

Certain implementations relate to methods for compressing data in a network system communicated across a data link. Each network system may include control circuitry configured to control the operation of the network system. Processes and operations performed by the network system may be implemented using the control circuitry. The network system may compress a chunk of data to be communicated over a data link using a plurality of compression algorithms. A data link among a plurality of data links may be selected based on the compression ratio of the compressed chunk and the chunk uncompressed for each of the plurality of compression algorithms, and a data link characteristic of each data link among the plurality of data links. A compression algorithm may be selected among the plurality of compression algorithms based on the compression ratio and the data link characteristic of each data link among the plurality of data links. The compressed chunk may be provided.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for compressing data based on data link characteristics. However, it will be understood by one of ordinary skill in the art that the systems and methods described herein may be adapted and modified as is appropriate for the application being addressed and that the systems and methods described herein may be employed in other suitable applications, including networked computing systems, data center systems, and cloud computing systems, and that such other additions and modifications will not depart from the scope thereof.

Figure 1:
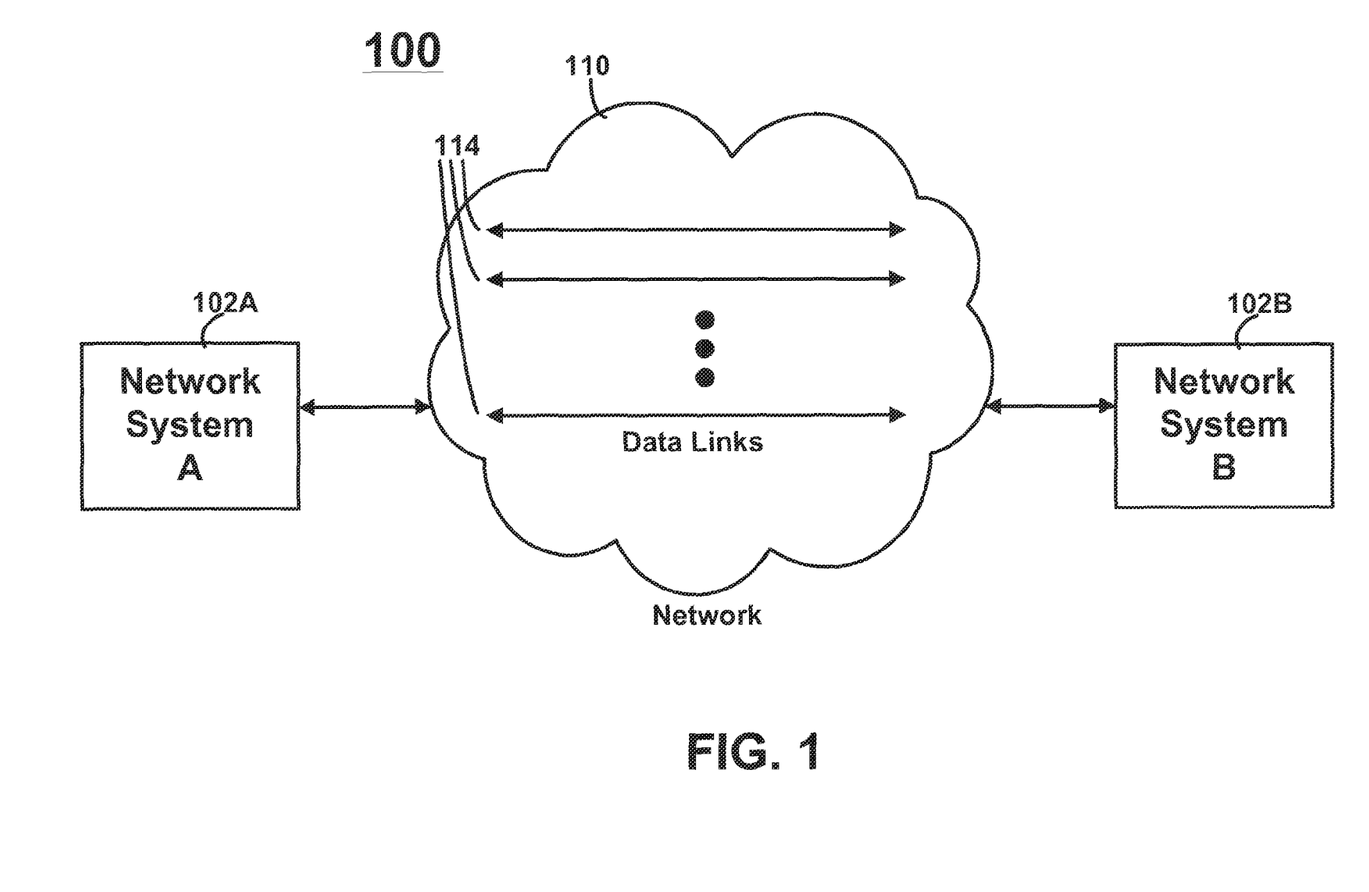
FIG. 1 is a simplified representation of multiple network systems communicating through a network in accordance with an implementation of the disclosure.

FIG. 1 shows a simplified representation 100 of multiple network systems 102A and 102B communicating through a network 110. Network systems 102 may communicate among each other through a network 110. Each network system 102 may include control circuitry configured to control the operation of the network system 102. Processes and operations performed by each network system 102 may be implemented using the control circuitry. Each network system 102 may send data to another network system 102.

Network 110 may include multiple data links 114 within network 110 that network systems 102 may use to communicate with each other. Each data link 114 may be a physical network link between a source network system 102 and a destination network system 102, such as Ethernet, ATM, fiber optic, wireless, or any other link that allows data communication between multiple network systems. Each data link 114 may also be a virtual network link, which is allocated bandwidth portions of a physical network link. The allocated bandwidth portions may be a pre-determined amount of bandwidth that may be used over the network 110.

A data link characteristic, may be a cost of transferring data over the data link 114, and may be pre-determined for each data link 114. The cost may be a monetary cost of using bandwidth over the data link. The characteristic may also represent an importance of bandwidth within the network for a particular data link 114. For example, data links 114 which provide a connection between two groups of network systems may be considered more valuable since all data communicated between the two groups is only sent over the specific data links 114. Another example of the importance of bandwidth within the network for a particular data link 114 is data links 114 between countries. There may be few data links 114 available to communicate data between network systems 102 between two countries. These data links 114 need to be shared by all services of the network system 102 and are generally scarcer than the data links 114 among network systems 102 within a country. The bandwidth used on valuable data links 114 should be minimized in order to improve network operations.

Each network system 102 may include at least one of servers, storage systems, and other datacenter systems. Data communicated between each network system 102 may be from any of the datacenter systems. In certain implementations, a network system 102 may consist of just one of the datacenter systems. Each network system 102 may include system resources, such as processors, memory, and storage. Network system 102, along with the control circuitry within each network system 102, are used to send data across a data link to another network system 102.

Figure 2:
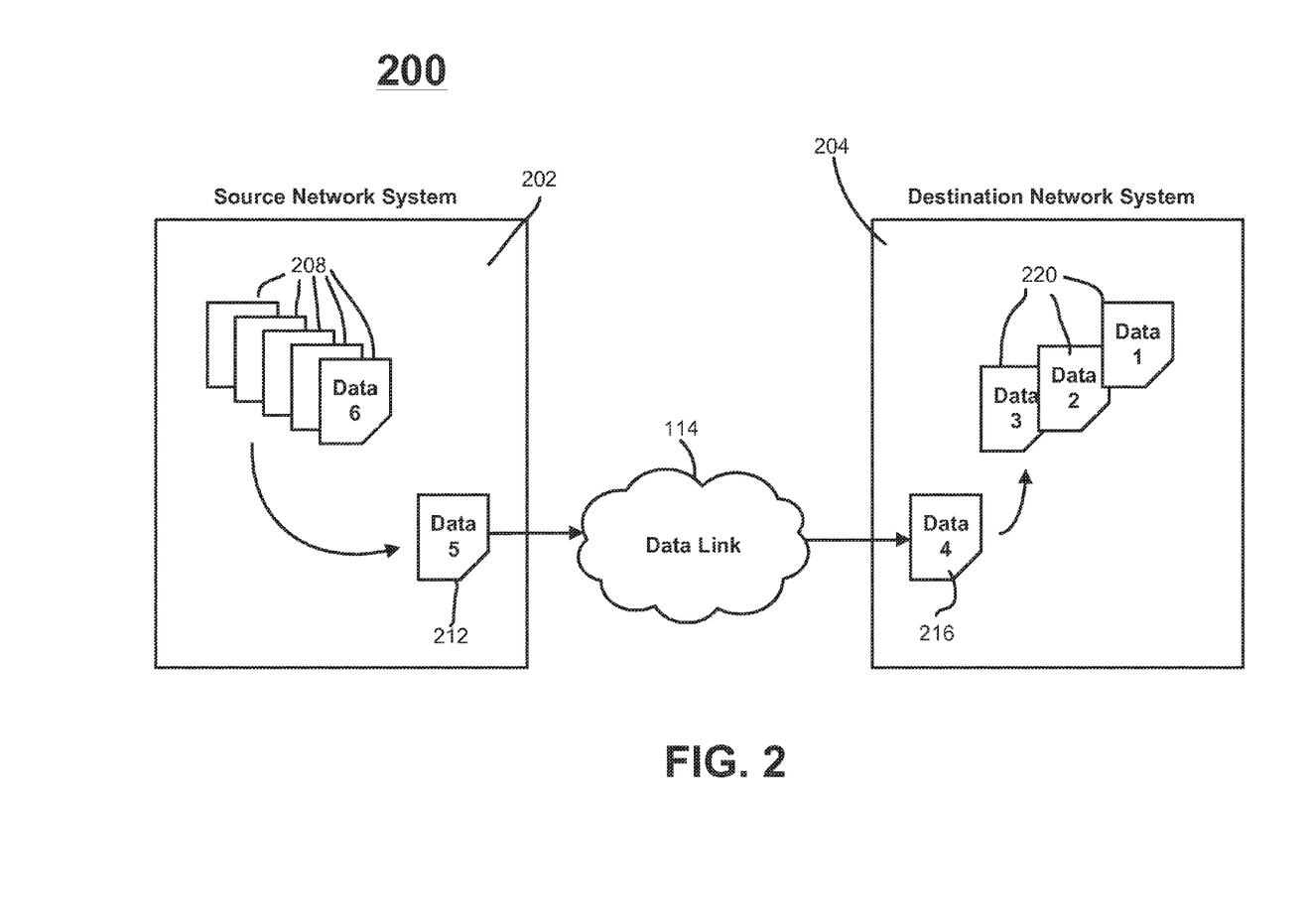
FIG. 2 is a simplified representation of data being sent between a source system and a destination system in accordance with an implementation of the disclosure.

FIG. 2 shows a simplified representation 200 of data being sent between a source network system 202 and a destination network system 204. Source network system 202 and destination network 204 may be network systems such as network system 102. Source network system 202 may send data 208 to destination network system 204, through a data link 114. Data 208 may be represented as multiple data files 208. For example, multiple data files 208 may be sent over data link 114. The destination network system 204 receives the data file 216 and may store the data files 220 received. Data files 208 may include media data files, such as video files, or music files, or digital documents, such as word processing documents, or spreadsheets, or any other digital documents; or other stored data that needs to be sent to another network system 102.

Figure 3:
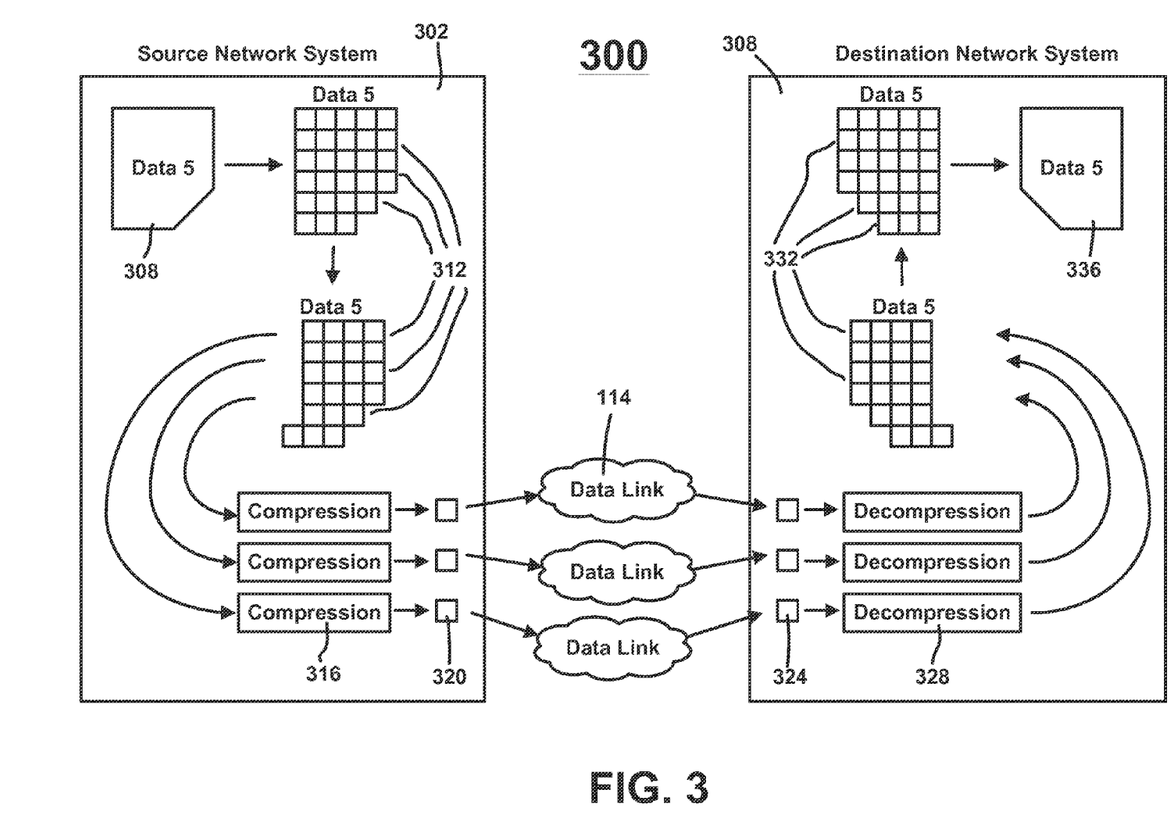
FIG. 3 is a simplified representation of data being compressed between a source system and a destination system in accordance with an implementation of the disclosure.

FIG. 3 shows a simplified representation 300 of data being compressed between a source system 302 and a destination system 304. Multiple data links 114 may be used to communicate data between a source network system 302 and a destination network system 304. Source network system 302 and destination network 304 may be a network system such as network systems as 102. In source network system 302, data 308, which may be represented as a data file 308, may be separated into multiple smaller portions 312, or chunks 312, which represent a pre-determined amount of data to be communicated. For example, a data file 308 may be divided into one megabyte chunks, or any other data size. Data 308 may also be a stream of data that is divided into pre-determined amounts of data. The chunks 312 may be the same size or different sizes.

Each chunk 312 may be compressed using a compression algorithm 316. In certain implementations, the data 308 may be compressed using a compression algorithm before chunking. In certain implementations, each chunk may be compressed using a different compression algorithm, or left uncompressed. Each compressed chunk 320 may be communicated over multiple data links 114 to the destination network system 304. The destination network system 304 receives the compressed chunks 324 of data 308. The destination network system 304 may decompress each chunk 324 using the corresponding decompression algorithm 328 for the chunk 324 received. The decompressed chunks 332 are then combined together to form the original data 336 sent. In certain implementations, the received data 336 may be uncompressed after all the chunks 324 for the received data 336 are received.

Compressing data 308 reduces the amount of bandwidth required to send data 308 across data link 114. For example, in certain cases, a 70-80% reduction in bandwidth used for transferring a data file may be seen using compression. The amount of compression may be even higher depending on the type of data sent. Selecting the compression algorithm 316 with a given compression strength, based on the data link characteristic can be important for reducing the bandwidth used in file transfers over the network. However, compressing and decompressing data 308 using compression algorithm 316 and decompression algorithm 328 may utilize system resources within a network system 102. Although network bandwidth is an important commodity to reduce, the cost of reducing the bandwidth should not cause excessive use of system resources of the network system 102, which may affect performance of other services provided by network system 102. Therefore, choosing which compression algorithm to use may be based on data link characteristics, compression strength, and system resource utilization required.

Figure 4:
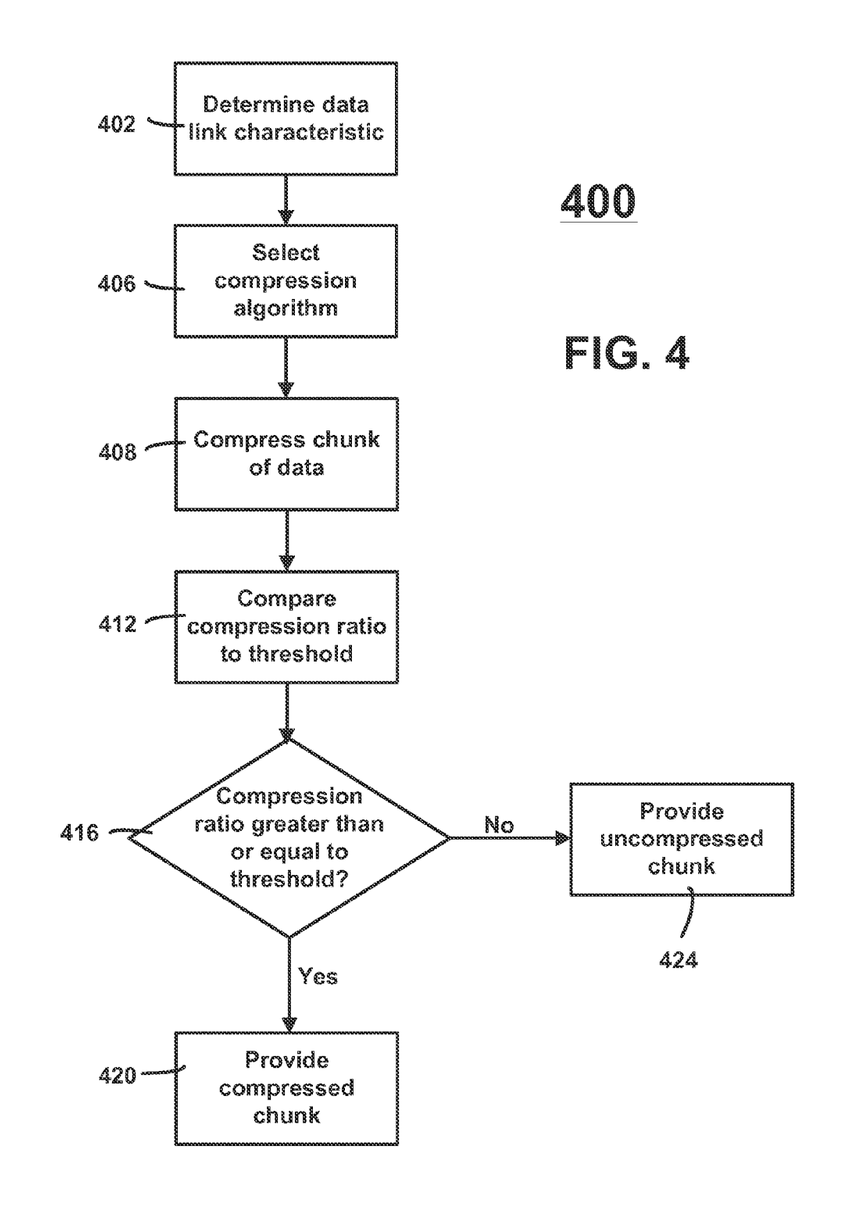
FIG. 4 is a flowchart representation of a technique for selecting a compression algorithm for compressing data in accordance with an implementation of the disclosure.

FIG. 4 shows a flowchart representation of a technique for selecting a compression algorithm 316 for compressing data 308. The technique for selecting a compression algorithm 316 is discussed using references from FIG. 3. At 402, a data link characteristic is determined for a particular data link between a source network system 302 and a destination network system 304. As mentioned herein, the data link characteristic may be the cost of transferring data over a data link 114. The data link characteristic may be known or pre-determined for each data link 114.

At 406, a compression algorithm 316 is selected among a plurality of compression algorithms 316 based on the determined data link characteristic. In certain implementations, the compression algorithm 316 may also be selected based on the compression strength of each compression algorithm 316. The compression strength indicates how well the compression algorithm 316 may compress data. A higher compression strength indicates that the compression algorithm 316 reduces the data size greater than a lower compression strength algorithm. The data link characteristic may be the cost of sending data over the data link, which may be relevant to how much compression strength is needed in a compression algorithm 316. A mapping table which maps different data link characteristic values to a compression algorithm 316 and its compression strength may be used to select the appropriate compression algorithm 316. In certain implementations, the compression algorithm 316 may also be selected based on the system resource utilization of each of the compression algorithms 316. In certain implementations, the system resource utilization of each compression algorithm 316 may be pre-determined based on simulations or a-priori knowledge. The system resource utilization of each compression algorithm 316 may also be used in the mapping table which maps different data link characteristic values to a compression algorithm 316 and its system resource utilization. In certain implementations, selection of the compression algorithm 316 may be based on the combination of both the compression strength and the system resource utilization of the compression algorithm 316 along with the data link characteristic.

In certain implementations, the compression algorithm 316 selected may be pre-determined based on the data type. The data type may be, for example, a video type, or a word processing document type. Types of data may be mapped to an appropriate compression algorithm 316. Certain compression algorithms 316 may perform poorly on and therefore are inappropriate for certain data types even though the compression algorithm 316 may be known to have a high compression strength. In certain implementations, the data type, the compression strength, the system resource utilization and the data link characteristic may all be used in any combination to determine the appropriate compression algorithm 316 to select.

At 408, a chunk 312 of the data 308 to be communicated over the data link 114 is compressed using the selected compression algorithm 316. At 412, a compression ratio, which is the ratio of the compressed size of the chunk 320 to the uncompressed size of the chunk 312, is compared with a compression threshold. The compression threshold may be based on the data link characteristic. For example, the compression threshold may represent the compression ratio needed to be achieved by a compression algorithm in order to justify compressing the rest of the chunks 312 of data 308.

Until the data 308 is compressed using the selected compression, the compression ratio is unknown. Therefore, after the data 308 is compressed, the compression ratio of the compressed data is compared to the compression threshold. Each data link 114 may have a different compression threshold which is determined based on the data link characteristic of the data link 114. Additionally, each data link 114 may have multiple compression thresholds. Each compression threshold for a data link may correspond to a particular compression algorithm.

At 416, based on whether the compression ratio is greater than or equal to the compression threshold, the uncompressed chunk 312 or the compressed chunk 320 may be provided for communication to the destination network system 304. At 420, if the compression ratio is greater than or equal to the compression threshold, the compressed chunk 320 is provided. However, at 424, if the compression ratio is not greater than or equal to the compression threshold, the uncompressed chunk 312 is provided. In certain implementations, the determination whether to provide the compressed chunk 320 or the uncompressed chunk 312, may be based on whether the compression ratio is greater than, less than, or less than or equal to the compression threshold.

In certain implementations, based on the comparison of the compression ratio and the compression threshold of a first chunk of the data, every other chunk within the data may use the same selected compression algorithm 316. In addition, if it is determined that the uncompressed chunk should be used, every other chunk within the data may also be left uncompressed.

Figure 5:
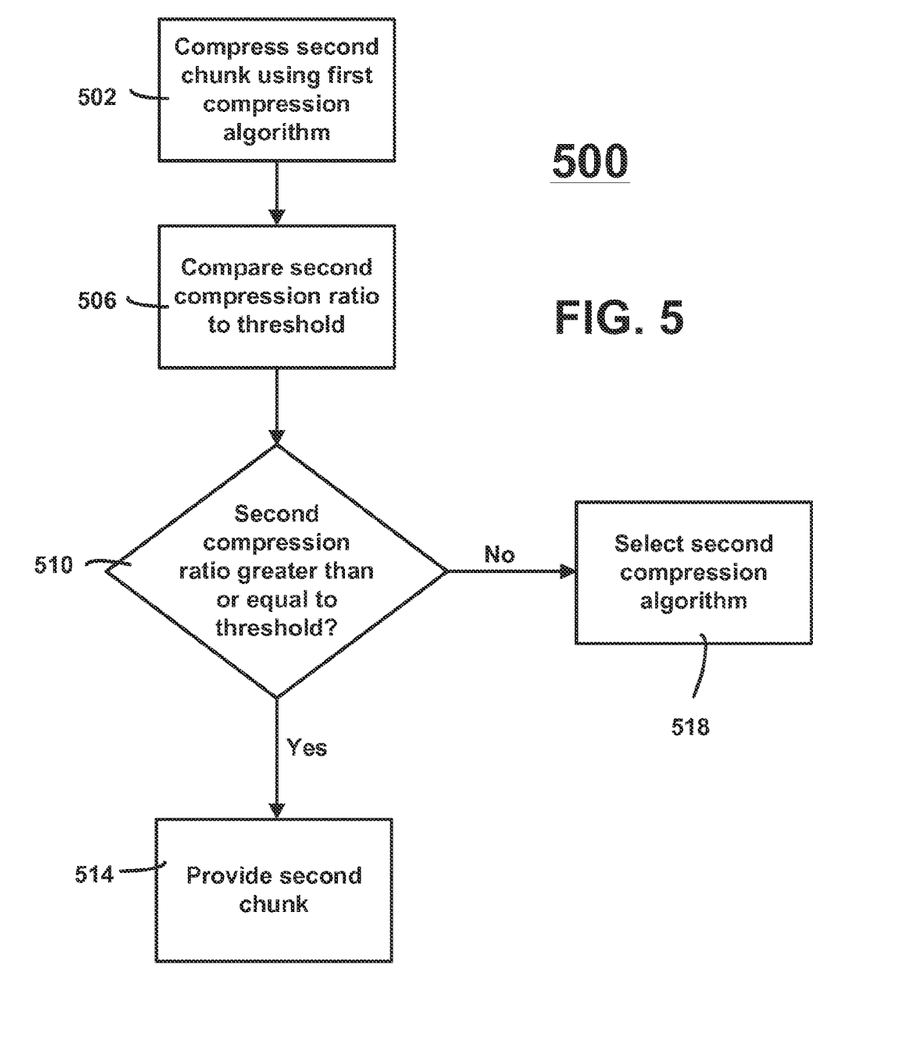
FIG. 5 is a flowchart representation of selecting another compression algorithm for compressing data in accordance with an implementation of the disclosure.

FIG. 5 shows a flowchart representation of selecting another compression algorithm for compressing data. In certain implementations, at 502, after another chunk has been compressed with the selected compression algorithm 316, the network system 302, at 506, may compare the compression ratio of the new compressed chunk of the data to the compression threshold. At 510, if the compression ratio is less than the compression threshold, network system 302, at 518, may select a new compression algorithm 316 to use. At 514, if the compression ratio is greater than or equal to the compression threshold, the compressed second chunk is provided. In certain implementations, the determination whether to provide the compressed chunk 320 or the uncompressed chunk 312, may be based on a comparison of the compression ratio to the compression threshold.

In certain implementations, the data link characteristic, and the compression ratio may be used to select the appropriate compression algorithm 316. Once a new compression algorithm 316 is selected, the network system 302 may compress the chunk with the new selected compression algorithm 316, and compare the compression ratio of the new selected compression algorithm 316 with a compression threshold. A determination whether to provide the compressed chunk using the selected new compression algorithm 316 is made based on a comparison of the compression ratio and the compression threshold. For example, if the compression ratio is greater or equal to the compression threshold, the compressed chunk is provided. On the other hand, an uncompressed chunk is provided if the compression ratio is less than the compression threshold.

Figure 6:
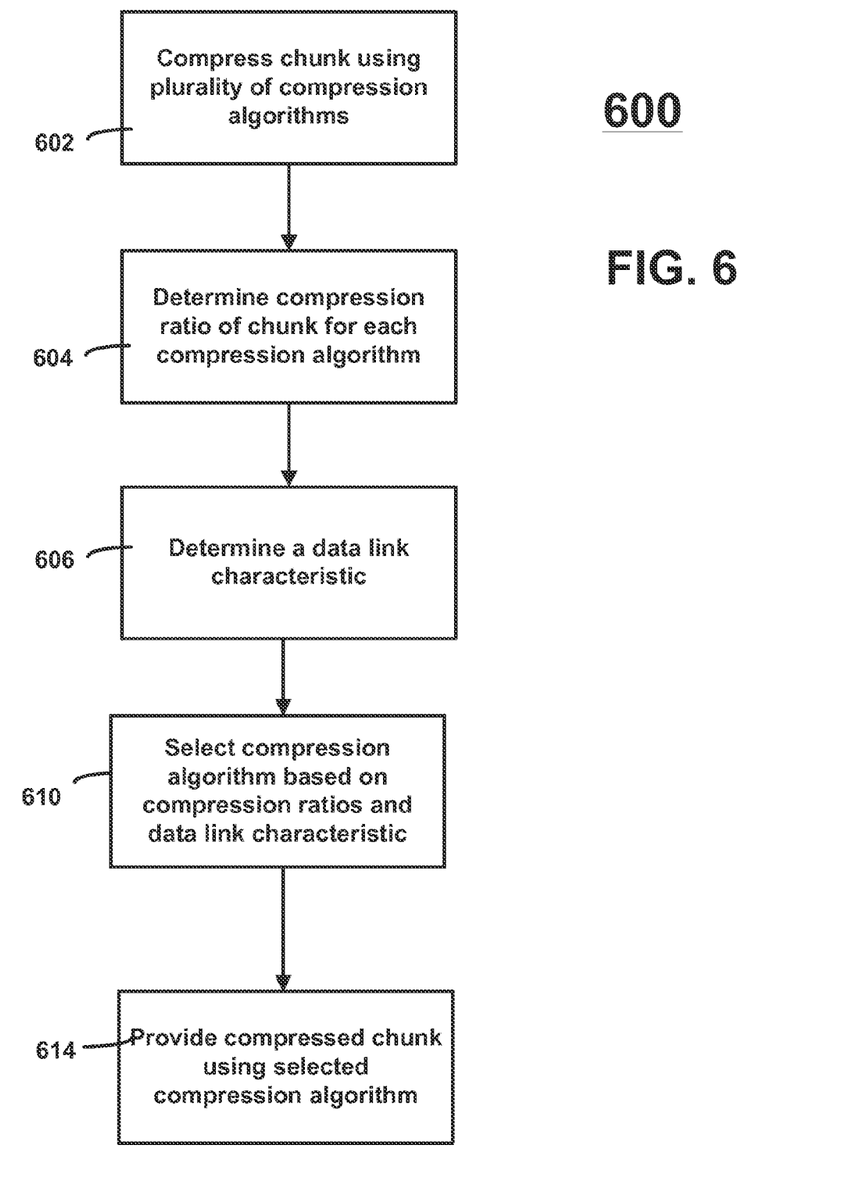
FIG. 6 is a flowchart representation of another technique for selecting a compression algorithm for compressing data in accordance with an implementation of the disclosure.

FIG. 6 shows a flowchart representation of another technique for selecting a compression algorithm for compressing data. Another way that a compression algorithm may be selected is by testing multiple compression algorithms on a chunk of data. Based on the compression ratio achieved by each compression algorithm, a compression algorithm is selected based on the compression ratios achieved on the chunk of data and the data link characteristics. By testing out multiple compression algorithms on a chunk of the data, a compression ratio specific to the data to be communicated over data link 114 may be used to determine which compression algorithm to select.

At 602, a first chunk of data may be compressed using a plurality of compression algorithms. In certain implementations, the first chunk may be the first chunk of the data file. At 604, compression ratios for each compression algorithm may be determined. The compression ratio is the ratio of the compressed chunk size to the uncompressed chunk size. At 606, a data link characteristic may be determined for a data link 114 used to communicate the data.

At 610, a compression algorithm may be selected based on the compression ratios of the first chunk for each of the compression algorithms, and based on the determined data link characteristic. In certain implementations, the compression algorithm that achieves the greatest compression ratio may be chosen. In some implementations, system resource utilization may also be determined for each compression algorithm used on the first chunk. Based on the system resource utilization and the compression ratio for each compression algorithm, the compression algorithm with appropriate trade-offs may be selected. The appropriate trade-offs may include the highest compression algorithm without exceeding a pre-determined system resource utilization, or a greatest value produced by a function which relates the compression ratio for each compression algorithm to the system resource utilization for each compression algorithm.

In certain implementations, the compression algorithm selected may be pre-determined based on the data type. The data type indicates what type of data it is. For example, the data being sent may be a video, or a word processing document. Depending on the type of data being sent, the appropriate compression algorithm may be known. In certain cases, certain compression algorithms may perform poorly on specific data types even though the compression algorithm may be known to have a high compression ratio. In certain implementations, the data type, the compression ratio, and the system resource utilization may be used in any combination to determine the appropriate compression algorithm to select. In certain implementations, a mapping table which maps different data link characteristic values to a compression algorithm and its compression ratio may be used to determine whether the selected compression algorithm should be used. At 614, the compressed chunk may be provided.

In certain implementations, the selected compression algorithm used for the first chunk may be used for all subsequent chunks for the data file. If the selected compression algorithm is to not compress the chunk, all the subsequent chunks for the data file may be sent uncompressed. Choosing not to compress the chunk may be a result of the compression ratio not exceeding the compression threshold, a data link characteristic, or a data type. In certain implementations, the compression ratio for subsequent chunks may be compared to a compression threshold. The compression threshold may be based on the data link characteristic of the data link being communicated over. The compression ratio of the selected compression algorithm may vary across different chunks of the data. Therefore, after a chunk is compressed, the compression ratio of the compressed chunk may be compared to the compression threshold. Based on the comparison of the compression ratio and compression threshold, a new compression algorithm may be selected.

Figure 7:
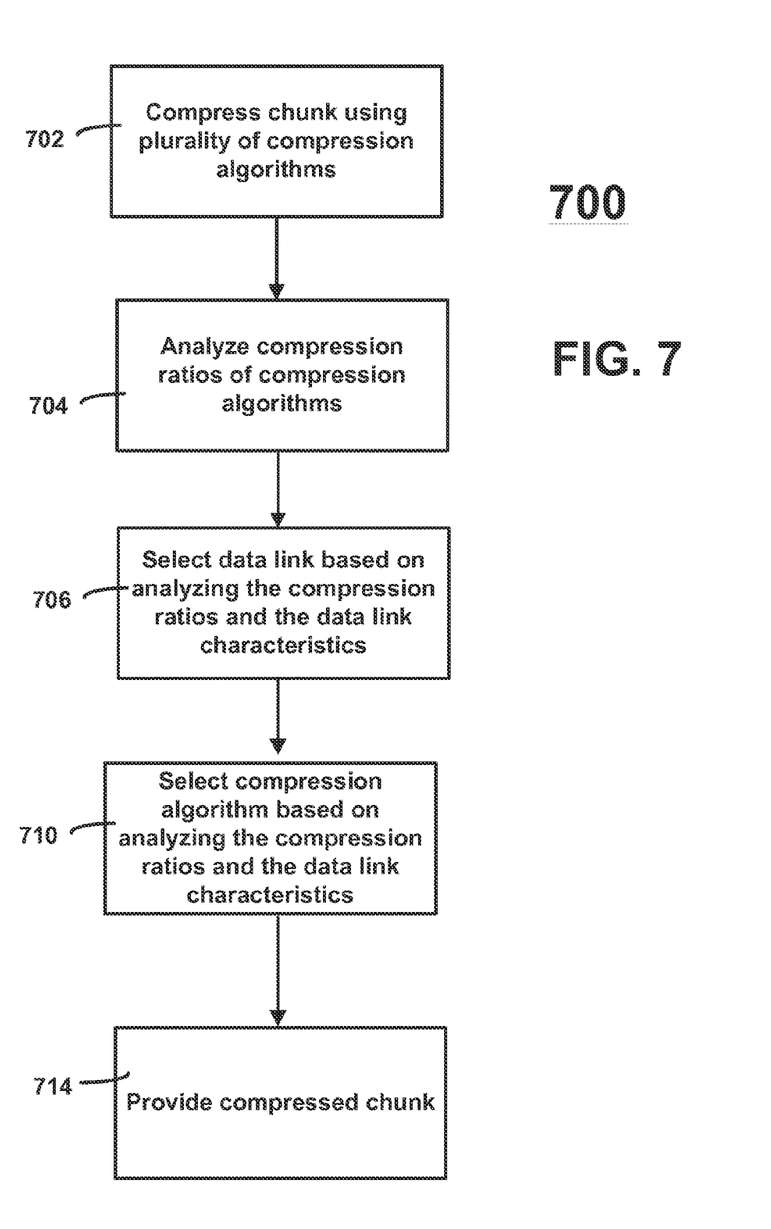
FIG. 7 is a flowchart representation of another technique for selecting a compression algorithm for compressing data and a data link in accordance with an implementation of the disclosure.

FIG. 7 shows a flowchart representation of another technique 700 for selecting a compression algorithm for compressing data and a data link 114. In network 110, multiple data links 114 may be available and used to communicate data from a source network system 302 to a destination network system 308. In some cases, the data link 114 may have been already selected. However, when multiple data links 114 are available, the data link 114 may also be selected based on tradeoffs between the data link characteristics for each data link 114 and compression ratios for each compression algorithm available. The order which the data link 114 is selected and the compression algorithm is selected may be switched.

At 702, a first chunk of data may be compressed using a plurality of compression algorithms. In certain implementations, the first chunk may be the first chunk of the data file.

At 706, a first data link 114 among a plurality of data links may be selected based on a compression ratio of the compressed size of the first chunk and the uncompressed size of the first chunk for each of the plurality of compression algorithms and a data link characteristic for each data link 114. The data link 114 may be selected based on optimizing the tradeoffs between the data link characteristic, which may include a cost of transferring data over the data link 114; the compression ratio, the amount of compression that is achieved for a chunk for each of the compression algorithms; and a system resource utilization for each of the compression algorithms.

At 710, a first compression algorithm among a plurality of compression algorithms may be selected based on the compression ratio for each of the plurality of compression algorithms and the data link characteristic for each data link. The compression algorithm may be selected to optimize tradeoffs between the data link characteristic, which may include a cost of transferring data over the data link 114; the compression ratio, the amount of compression that be achieved for using each of the compression algorithms; and a system resource utilization for each of the compression algorithms. In certain implementations, the data link characteristic may be based on the selected data link 114. In certain implementations, the compression algorithm may be selected before the data link is selected, therefore all the data link characteristics for each data link 114 may be used in selecting the first compression algorithm.

In certain implementations, the compression algorithm that achieves the greatest compression ratio may be chosen. In certain implementations, system resource utilization may also be considered for each compression algorithm used on the first chunk. Based on the system resource utilization and the compression ratio for each compression algorithm, the compression algorithm and also the data link with the appropriate trade-offs may be selected. The appropriate trade-offs may include the highest compression algorithm without exceeding a pre-determined system resource utilization. In certain implementations, the appropriate trade-offs may be based on comparing values generated by a function which relates the compression ratio for each compression algorithm, the system resource utilization for each compression algorithm, and the data link characteristics for each data link 114. For example, the data link 114 or compression algorithm with the largest function value may be selected.

At 714, the network system 102 provides the compressed chunk using the selected compression algorithm over the selected data link 114. In certain implementations, the selected compression algorithm used for the first chunk may be used for all subsequent chunks for the data file over the selected data link. If the selected compression algorithm is to not compress the chunk, all the subsequent chunks for the data file may be sent uncompressed. In certain implementations, the compression ratio for subsequent chunks may be compared to a compression threshold. The compression threshold may be based on the data link characteristic of the data link being communicated over. The compression ratio of the selected compression algorithm may vary across different chunks of the data. Therefore, after a chunk is compressed, the compression ratio of the compressed chunk may be compared to the compression threshold. Based on the comparison of the compression ratio and compression threshold, a new compression algorithm, and a new data link 114 may be selected.

Figure 8:
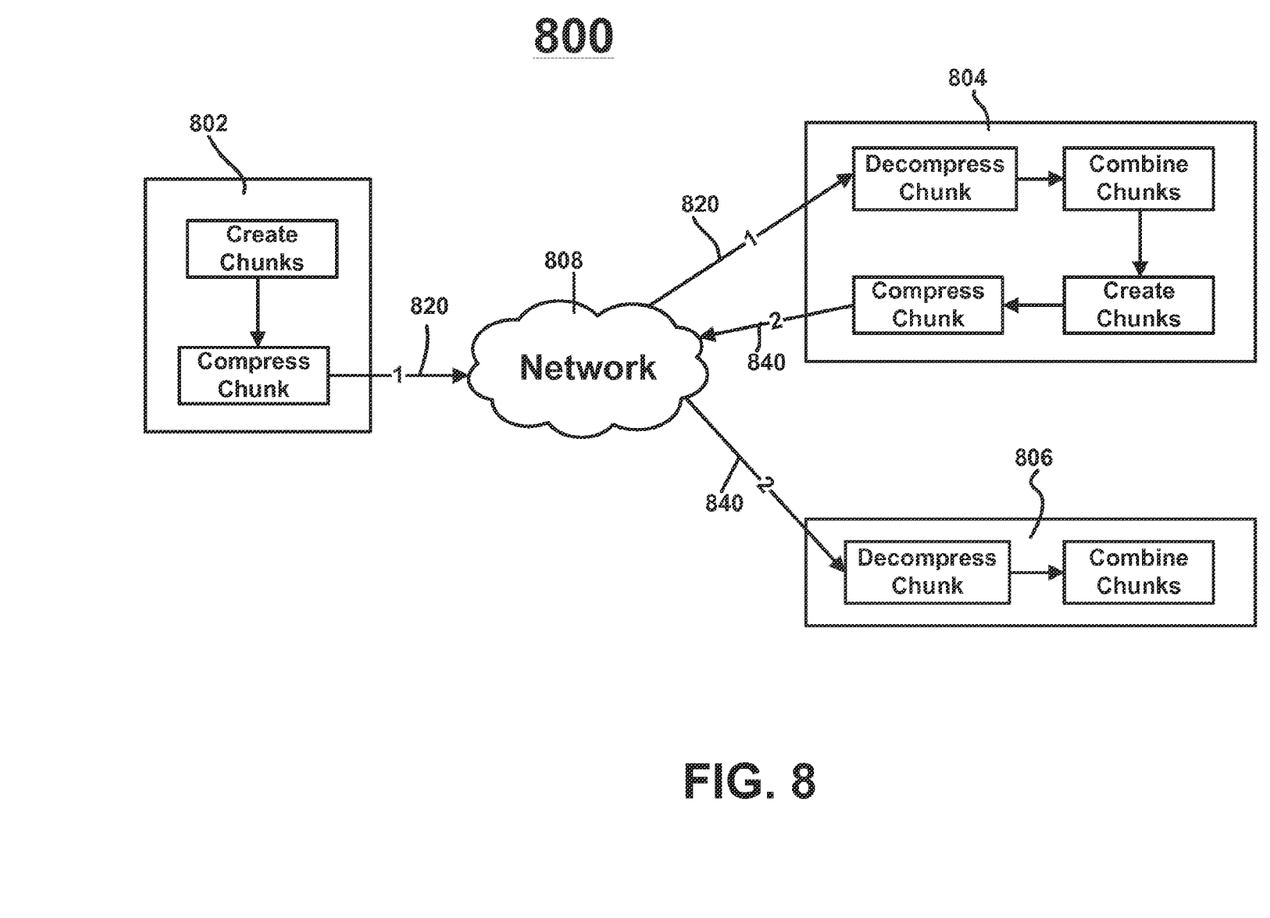
FIG. 8 is a simplified representation of multiple network systems compressing and decompressing data communicated between each other through a network in accordance with an implementation of the disclosure.

FIG. 8 is a simplified representation of multiple network systems 800 compressing and decompressing data communicated between each other through a network 808. Three network systems, 802, 804, and 806, which may be similar to network system 102, are shown. Each network system 802, 804 and 806 may perform the process of selecting and compressing chunks of data similar to the techniques discussed with respect to FIGS. 4, 5, 6, and 7. Though a more complicated process occurs within each network system, a simplified depiction is shown for convenience. A network system 802 compresses chunks of data which are provided to network system 804 over the network 808 through data link 820. Once network system 804 receives the compressed chunks, the chunks are decompressed and stored in the network system 804. However, if the data is to be sent to network system 806 over the network 808 through data link 840, network system 804 may recompress the decompressed data received from network system 802 and provide it to network system 806. The decompressing and recompressing operations may waste system resources since the data was already compressed previously by network system 802.

Figure 9:
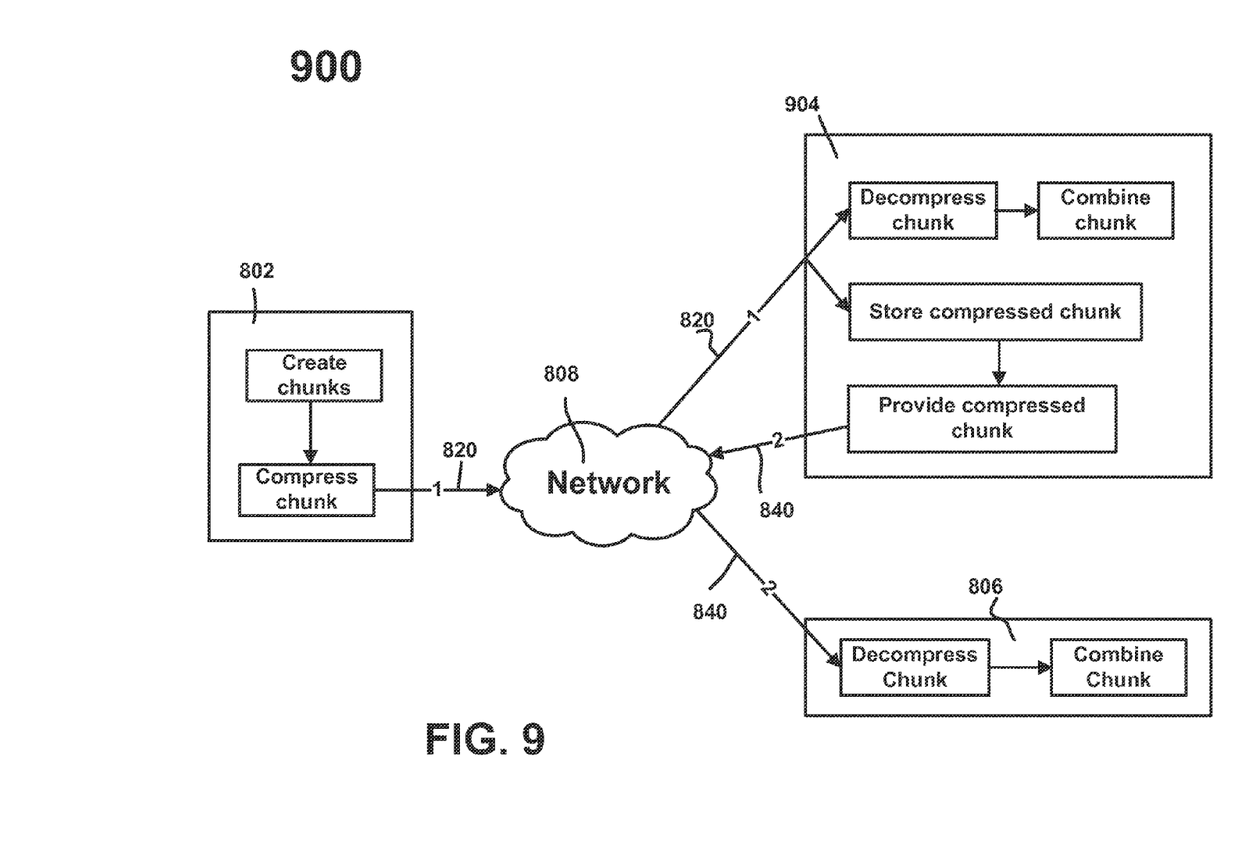
FIG. 9 is another simplified representation of multiple network systems compressing and decompressing data com-

FIG. 9 is another simplified representation of multiple network systems 900 compressing and decompressing data communicated between each other through a network. Three network systems, 802, 904, and 806, which may be similar to network system 102, are shown. Each network system may perform the process of selecting and compressing chunks of data similar to the techniques discussed with respect to FIGS. 4, 5, 6, and 7. However, network system 904 may be configured to temporarily store the compressed chunks received from network system 802, and provide the already compressed chunks to network system 806. By temporarily storing the compressed chunks, the use of additional system resource for recompressing the data chunks is prevented. This essentially trades storage space, which stores the received compressed chunks, for system resource utilization like memory and processor utilization, which would have been wasted if the data chunks needed to be recompressed again.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. For example, in FIG. 7, the order which data link 114 and a compression algorithm is selected may be in any order, where the data link 114 is selected before the compression algorithm is selected or vice versa. In certain circumstances, multitasking and parallel processing may be advantageous. Further, certain portions of the disclosure may be implemented as "logic" or a "component" that performs one or more functions. This logic may include hardware, such as an application specific integrated circuit or a field programmable gate array, software, or a combination of hardware and software.

What is claimed is:

1. A method for compressing data in a network system communicated across a data link comprising:
   determining, using control circuitry, a monetary cost of transferring data over a first data link between a source and a destination, wherein the monetary cost is a first data link characteristic of the first data link;
   selecting, using the control circuitry, a first compression algorithm among a plurality of compression algorithms based on the determined monetary cost and further based on a system resource utilization associated with usage of the first compression algorithm;
   compressing, using the selected first compression algorithm, a first chunk of data to be communicated over the first data link;
   identifying a first compression threshold based on the monetary cost of transferring data over the first data link;
   comparing, using the control circuitry, a first compression ratio of the compressed first chunk and the first chunk uncompressed to the first compression threshold; and
   providing, using the control circuitry, the compressed first chunk if the first compression ratio is greater or equal to the first compression threshold; or
   providing, using the control circuitry, the first chunk uncompressed if the first compression ratio is less than the first compression threshold.

2. The method of claim 1, wherein selecting the first compression algorithm is further based on a compression strength for each of the plurality of compression algorithms.

3. The method of claim 1, wherein selecting the first compression algorithm is based on a mapping between the first data link characteristic and a compression strength for each of the plurality of compression algorithms.

4. The method of claim 1, wherein selecting the first compression algorithm is based on a data type.

5. The method of claim 1, further comprising:
   compressing, using the selected first compression algorithm, a second chunk of data to be communicated over the first data link;
   providing, using the control circuitry, the compressed second chunk.

6. The method of claim 1, further comprising:
   compressing, using the selected first compression algorithm, a second chunk of data to be communicated over the first data link;
   comparing, using the control circuitry, a second compression ratio of the compressed second chunk and the second chunk uncompressed to the first compression threshold; and
   selecting, using the control circuitry, a second compression algorithm among the plurality of compression algorithms based on the first data link characteristic and the second compression ratio if the second compression ratio is less than the first compression threshold.

7. The method of claim 6, further comprising:
   compressing, using the selected second compression algorithm, the second chunk of data to be communicated over the first data link;
   comparing, using the control circuitry, a third compression ratio of the second chunk compressed using the second compression algorithm and the second chunk uncompressed to the first compression threshold; and
   providing, using the control circuitry, the compressed second chunk if the third compression ratio is greater or equal to the first compression threshold; or providing, using the control circuitry, the second chunk uncompressed if the third compression ratio is less than the first compression threshold.

8. A system for compressing data in a network system communicated across a data link, the system comprising control circuitry configured to:
determine a monetary cost of transferring data over a first data link between a source and a destination, wherein the monetary cost is a first data link characteristic of the first data link;
select a first compression algorithm among a plurality of compression algorithms based on the determined monetary cost of transferring data over the first data link and further based on a system resource utilization associated with usage of the first compression algorithm;
compress, using the selected first compression algorithm, a first chunk of data to be communicated over the first data link;
identify a first compression threshold based on the monetary cost of transferring data over the first data link;
compare a first compression ratio of the compressed first chunk and the first chunk uncompressed to the first compression threshold; and
provide the compressed first chunk if the first compression ratio is greater or equal to the first compression threshold; or
provide the first chunk uncompressed if the first compression ratio is less than the first compression threshold.

9. The system of claim 8, wherein selecting the first compression algorithm is further based on a compression strength for each of the plurality of compression algorithms.

10. The system of claim 8, the system comprising control circuitry further configured to select the first compression algorithm based on a mapping for the first data link characteristic and the system resource utilization for each of the plurality of compression algorithms.

11. The system of claim 8, the system comprising control circuitry further configured to select the first compression algorithm based on a data type.

12. The system of claim 8, the system comprising control circuitry further configured to:
compress, using the selected first compression algorithm, a second chunk of data to be communicated over the first data link;
provide the compressed second chunk.

13. The system of claim 8, the system comprising control circuitry further configured to:
compress, using the selected first compression algorithm, a second chunk of data to be communicated over the first data link;
compare a second compression ratio of the compressed second chunk and the second chunk uncompressed to the first compression threshold; and
select a second compression algorithm among the plurality of compression algorithms based on the first data link characteristic and the second compression ratio if the second compression ratio is less than the first compression threshold.

14. The system of claim 13, the system comprising control circuitry further configured to:
compress, using the selected second compression algorithm, the second chunk of data to be communicated over the first data link;
compare a third compression ratio of the second chunk compressed using the second compression algorithm and the second chunk uncompressed to the first compression threshold; and
provide the compressed second chunk if the third compression ratio is greater or equal to the first compression threshold; or
provide the second chunk uncompressed if the third compression ratio is less than the first compression threshold.

15. A method for compressing data in a network system communicated across a data link comprising:
for each of a plurality of data links, determining a respective monetary cost of transferring data over the respective data link;
for each of a plurality of compression algorithms, compressing, by control circuitry at a first network system, a first chunk of data to be communicated, and determining a respective compression ratio for the respective compression algorithm based on compression of the first chunk of data;
selecting, using the control circuitry, a first data link from the plurality of data links and a first compression algorithm from the plurality of compression algorithms based on a function of:
(a) each of the determined monetary costs of transferring data over the respective data links, and
(b) for each of the plurality of compression algorithms,
(i) the respective compression ratio and
(ii) a respective system resource utilization associated with usage of the respective compression algorithm; and
providing, using the control circuitry, the first chunk of data compressed using the selected first compression algorithm over the selected first data link.

16. The method of claim 15, wherein the system resource utilization associated with usage of each of the plurality of compression algorithms includes utilization of a processor, memory, or storage resource.

17. The method of claim 15, wherein selecting the first data link is based on a mapping between the respective monetary cost of transferring data over each data link among the plurality of data links and the respective compression ratio for each of the plurality of compression algorithms.

18. The method of claim 15, wherein selecting the first compression algorithm is based on a mapping between the respective monetary cost of transferring data over each data link among the plurality of data links and the respective compression ratio for each of the plurality of compression algorithms.

19. The method of claim 15, wherein selecting the first compression algorithm is based on a data type.

20. The method of claim 19, wherein selecting the first compression algorithm is based on a pre-determined compression algorithm among the plurality of compression algorithms for the data type.

21. A system for compressing data communicated from a first computer system to a second computer system, the system comprising:
a first computer system, the first computer system comprising control circuitry configured to:
determine a value for a first data link characteristic of a first data link between the first computer system and a second computer system, wherein the first data link characteristic is a monetary cost of transferring data over the first data link;
select a first compression algorithm among a plurality of compression algorithms based on the value for the first data link characteristic and further based on a system resource utilization of a processor, memory, or storage resource used by the first compression algorithm;

compress a first chunk of data to be communicated over the first data link based on the selected first compression algorithm;

identify a first compression threshold based on the value for the first data link characteristic;

determine whether a first compression ratio based on the compressed first chunk is greater or equal to the first compression threshold; and provide the compressed first chunk to be communicated to the second computer system based on determining that the compression ratio based on the compressed first chunk is greater or equal to the first compression threshold; and the second computer system, the second computer system comprising control circuitry configured to decompress the first chunk of data compressed by the first computer system.

22. The system of claim 21, further including a third computer system, the second computer system comprising control circuitry further configured to:
store the received first chunk of data compressed by the first computer system; and provide the stored compressed first chunk of data; and the third computer system comprising control circuitry configured to:
decompress the first chunk of data compressed by the first computer system provided by the second computer system.

23. The system of claim 21, wherein the first computer system control circuitry is further configured to select the first compression algorithm based on a compression strength for each of the plurality of compression algorithms.

24. The system of claim 23, wherein the first computer system control circuitry is further configured to select the first compression algorithm based on a mapping between the first characteristic of the first data link and the compression strength for each of the plurality of compression algorithms.

25. The system of claim 21, wherein the first computer system control circuitry is further configured to select the first compression algorithm based on a data type.

26. The system of claim 21, wherein the first computer system is configured to select the first compression algorithm further based on a second data link characteristic for the first data link.

27. The system of claim 21, wherein the first computer system is configured to identify the first compression threshold further based on a second data link characteristic for the first data link.

28. The system of claim 21, wherein the first computer system control circuitry is further configured to:

compress, using the selected first compression algorithm, a second chunk of data to be communicated over the first data link;

determine whether a second compression ratio of the compressed second chunk and the second chunk uncompressed is greater or equal to the first compression threshold; and select, a second compression algorithm among the plurality of compression algorithms based on the first data link characteristic and the second compression ratio based on determining that the second compression ratio is less than the first compression threshold.

29. The system of claim 21, wherein the first computer system control circuitry is further configured to:
select the first data link from among a plurality of data links between the first computer system and a second computer system based on a respective compression ratio for each of the plurality of compression algorithms.

30. The method of claim 1, the method further comprising selecting the first data link from among a plurality of data links between the source and the destination based on a respective compression ratio for each of the plurality of compression algorithms.

31. The method of claim 1, wherein selecting the first compression algorithm is further based on a second data link characteristic for the first data link.

32. The method of claim 1, wherein identifying the first compression threshold is further based on a second data link characteristic for the first data link.

33. The system of claim 8, the system comprising control circuitry configured to:
select the first data link from among a plurality of data links between the source and the destination based on a respective compression ratio for each of the plurality of compression algorithms.

34. The system of claim 8, the system comprising control circuitry configured to select the first compression algorithm further based on a second data link characteristic for the first data link.

35. The system of claim 8, the system comprising control circuitry configured to identify the first compression threshold further based on a second data link characteristic for the first data link.

36. The method of claim 15, wherein the function optimizes tradeoffs between the determined respective monetary costs, the respective compression ratio, and the respective system utilization.

37. The method of claim 15, wherein the function selects an optimal compression algorithm that results in a highest compression ratio without exceeding a threshold system resource utilization pre-determined based on the monetary cost of transferring data over the respective data link.

* * * * *